United States Patent [19]
Allenspach et al.

[11] 3,788,410
[45] Jan. 29, 1974

[54] FORCE MEASURING APPARATUS INCLUDING SENSITIVITY SELECTION MEANS

[75] Inventors: Heinz Allenspach, Fallanden; Eugen Meier, Meilen, both of Switzerland

[73] Assignee: Mettler Instruments AG, Zurich, Switzerland

[22] Filed: Aug. 2, 1972

[21] Appl. No.: 277,162

[30] Foreign Application Priority Data
Aug. 19, 1971 Switzerland.................... 012209/71

[52] U.S. Cl.................. 177/25, 177/210, 177/211, 235/151.33
[51] Int. Cl............................................. G01g 23/22
[58] Field of Search . 324/78 D, 79 D; 73/133, 67.2, 73/137, 138; 235/151.33; 177/210, 211, 25

[56] References Cited
UNITED STATES PATENTS
| | | | |
|---|---|---|---|
| 3,366,191 | 1/1968 | Reid et al. ........................... | 73/67.2 |
| 3,559,066 | 1/1971 | Pincus.............................. | 324/78 D |
| 3,221,250 | 11/1965 | An Wang.......................... | 324/78 D |
| 2,974,863 | 3/1961 | Williams, Jr. et al.......... | 235/157.33 |

FOREIGN PATENTS OR APPLICATIONS
1,049,595    11/1966    Great Britain.................... 324/78 D Primary Examiner—Richard B. Wilkinson
Assistant Examiner—Vit W. Miska
Attorney, Agent, or Firm—Lawrence E. Laubscher

[57] ABSTRACT

Force measuring apparatus of the type including a mechanical oscillator, such as a string, that vibrates under load to produce a signal voltage the frequency of which is a function of the force to be measured. The invention is characterized in that following multiplication of the signal frequency, the signal is fed to multi-stage counter means for selected long or short periods of time corresponding with the desired sensitivity of measurement. The duration of the period of connection is controlled by a gate timing switch which is operable simultaneously with a stage selection switch associated with the counter, whereby when the connection periods are alternately long and short, the signal to be counted is fed to lower and upper counter stages, respectively. The gate tuning switch is operable alternately by a reference signal supplied from a mechanical oscillator, such as a crystal, or a reference string contained in the same housing as the measuring string.

5 Claims, 1 Drawing Figure

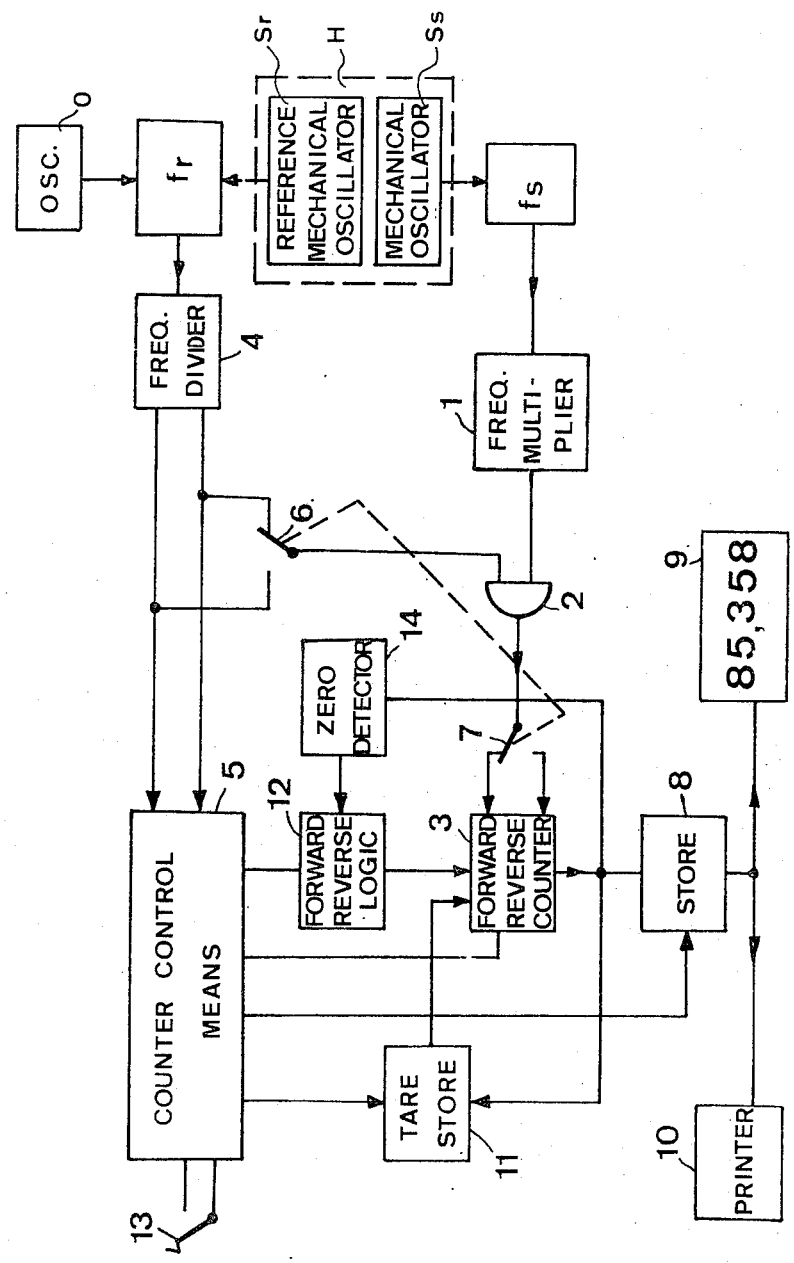

FORCE MEASURING APPARATUS INCLUDING SENSITIVITY SELECTION MEANS

This invention relates to a force-measuring apparatus having at least one mechanical oscillator (for example, a measuring string).

Force-measuring devices have been proposed in the prior art that include mechanical oscillator means that are acted upon by the force to be measured and whose respective frequency of oscillation is counted over a predetermined measuring period and is used for the digital representation of the magnitude of the force to be measured. Such devices have been put to increasing use (for example, as string balances) primarily because of the easy possibility of digital representation of the magnitude of force to be measured by frequency counting (as described in principle, for example, in the journal VDI, volume 98, No. 26, pages 1,541 to 1,588, September 1956).

One disadvantage of the previously known devices is that if the resolution and thus the sensitivity of the device are to be increased, it is necessary to provide a prolongation of the measuring time, thereby requiring more pulses to be counted, which naturally requires more time, for any given frequency of oscillation. This factor sets certain limits on the use of force-measuring devices with one or more oscillators, particularly where a rapid sequence of weighing operations combined with a high degree of sensitivity is required. Also, the known devices are generally each fixed at a given measuring period due to their design, even for measuring operations in which the advantage of a higher degree of resolution is of little or no importance and a shorter measuring period could therefore advantageously be employed. The latter is always the case as regards approximate measurements, for example in the case of balances for weighing-in operations, for approximate determinations of weight (for example, in the case of a preliminary determination of weight), or certain spot checking weighing operations.

Accordingly, a primary object of the present invention is to provide a force-measuring apparatus including at least one mechanical oscillator which in operation is acted upon by the force to be measured, means for counting the resulting frequency of oscillation over a given counting period and for representing digitally the magnitude of the force to be measured, frequency multiplier means for multiplying the frequency of oscillation of the mechanical oscillator means, and means for varying the counting period.

By use of the frequency multiplier means, the number of counting pulses per unit of time can be of any selected value so that a very substantial sensitivity of display is achieved regardless of the order of magnitude of the particular frequency of the oscillator. The time involved therewith can, if necessary, be reduced by reducing the counting time in any one of a number of various ways. A preferred arrangement is one in which a gate circuit with adjustable gate times and a switchable counter are used. Preferably the gate times are switchable in decade stages.

One arrangement which has been found desirable for the counter is one in which with each reduction in the gate time by one stage, the respective lowest counting stage is separated off so that the counting pulses pass into the correspondingly higher stages and represent a correspondingly higher value of the force. The indication means arranged downstream of the counter than always remains correct with regard to place value, which affords advantageous read-off (since in this way an error in the order of magnitude is scarcely possible, even when switching over to a different degree of sensitivity, because the position of the decimal point remains uniform).

In accordance with another object of the invention, means are provided for effecting automatic taring, different oscillator means (for example, a quartz oscillator) being used to supply the reference frequency. Furthermore, with string force-measuring devices it is possible to use a reference string of corresponding stability (and preferably identical geometry) which is then best arranged in the same housing as the measuring string, whereby any interference influence, such as changes in temperature, humidity, vibrations, or ageing effects have the same effect on the measuring string or strings and on the reference string.

The various frequencies (oscillator frequency, multiplication factor) and gate times, and also the basic or pre-load of the apparatus, are preferably so correlated that the counting result will be represented directly in units of weight.

One embodiment of the force-measuring apparatus according to the present invention will now be described by way of example with reference to the accompanying drawing the single figure of which is a block circuit diagram of the essential elements of a single-string balance with automatic taring means.

The string balance, which is generally of the type illustrated in the prior Meier U.S. application Ser. No. 359,258 filed May 11, 1973, the Gallo U. S. Pat. No. 3,612,198 and the Wirth et al U. S. Pat. No. 3,621,713, among others, includes a measuring string Ss which is mounted in a housing H under a preload of 1,700 p, oscillates at a counting frequency of 15kHz. It has a weighing range of 100p, which produces a rise in frequency of string oscillation (signal change) of 500Hz, which represents for practical purposes a very low degree of resolution.

The particular frequency $f_s$ of the measuring string is passed to a frequency multiplier 1 and there increased by 200 times, so that, with the multiplied counting frequency rising over the weighing range, from 3,000,000 to 3,100,000 Hz, the signal change represented by the rise in string frequency is now 100,000 Hz.

The multiplied counting frequency is passed to a gate 2 and from there, while the gate is open, to a multistage forward-reverse counter 3.

A reference frequency $f_r$ is produced by a quartz oscillator O. This frequency $f_r$ is passed to a gate time divider or frequency divider 4, and from there to the gate 2 and also to conventional counter control means 5. The counter control means are of the type disclosed in the copending Allenspach U.S. application Ser. No. 244,054 filed Apr. 14, 1972, and need not be discussed in detail here. The gate time divider 4 can be switched over so as selectively to give a gate open time of 1 s or 0.1 s.

[The gate circuit (gate 2 and divider 4) can also be controlled by a reference string $S_r$ which is preferably arranged in the same housing H as the measuring string $S_s$.]

Change over is effected by a gate timing switch 6 which is operable manually in synchronism with the stage selection switch 7, so that actuation of the switch 6 automatically also actuates the switch 7. The stage selection switch 7 has the effect that, when the gate time is reduced from 1 s to 0.1 s, the counting pulses arrive displaced upwardly by a decade stage, (i.e., the place which was previously the last place is cut off, thereby reducing the least significant figure by one).

In this way, even with a reduced counting period, the counting result has the correct place values, except that each counting pulse now represents ten times the weight value. For example, instead of a result of 85.358 g, the result would be 85.35 g.

After a counting period has elapsed, the resulting condition of the counter 3 is transferred into indication storage means 8, from which the result can be read off by an indication means 9. A printer output 10 can also be provided, as illustrated.

The first place ('3') is excepted from the indication, that is to say, with a counting period or gate open time of 1 s, the result appears in six-figure form, while with a counting period of 0.1 s, it is in five-figure form.

For weighing operations with tare, there is connected in parallel with the indication storage means 8 a tare storage means 11, while a forward-reverse logic circuit 12 is also connected between the counter control means 5 and the counter 3. A manually operable tare switch 13 is connected to the counter control means 5 to act thereon and a zero detector 14 is connected to the forward-reverse logic circuit 12. When carrying out weighing operations with tare, actuation of the tare switch 13 causes the weight result given by determination of the tare to be transferred to and stored in the tare storage means 11. In a subsequent weighing operation, the weight value in the tare storage means 11 is passed at the beginning of the operation into the counter 3. The forward-reverse logic circuit 12 causes the counter 3 to count backwards, that is to say, the counting pulses entering the counter 3 are subtracted from the tare weight until the zero detector 14 signals that zero weight has been reached in the counter 3. The signal from the zero detector 14 passes to the forward-reverse logic circuit 12 which now causes the counter 3 to count in the forward direction. In this way, when a gross weighing operation follows determination of the tare, the weighing result given is the net weight.

It is obvious that it is also possible to weigh in a plurality of components, while indicating the net weight of each component as it is added, by actuation of the tare switch 13 before each component is to be weighed.

The counter switching-over with correct place values, as described above, has the result that a tare value information stored in the means 11 at the beginning of a measuring operation is not lost, even after the counting period has possibly been switched over, but retains its correct place value.

The embodiment described above has two gate times of 1 s and 0.1 s. Other times could obviously be provided, for example, 2 and 0.2 s, as required. Also, instead of two gate times, it is possible to provide more gate times if the particular requirements to which the device is subject make this seem desirable or necessary.

The apparatus according to the invention can also be used as a plus-minus balance. In this case the gate times could, for example, be selected such that one counting pulse corresponds to the permissible amount of tolerance.

Although the apparatus as described above is in the form of a single-string measuring apparatus, the invention can also be in the form of a device which utilizes a plurality of controlled measuring oscillators or strings.

The above-described force-measuring apparatus is flexible in use, in that measurements with a high degree of sensitivity and thus a relatively long measuring time, and measurements with a more moderate degree of sensitivity and therefore a shorter measuring time, can be selectively performed with the same apparatus. For example, when weighing-in material, the apparatus can be used to weigh a first amount of added material which is delivered rapidly, weighing being with a low degree of sensitivity, until the weight approaches the set value, whereupon the apparatus is switched over to weigh-in a slower addition of material with a higher degree of sensitivity, until the set weight is reached.

What is claimed is:

1. Weighing apparatus, comprising
  a. means including at least one mechanical oscillator for producing a signal voltage the frequency of which is a function of the force to be measured;
  b. frequency multiplier means for multiplying the frequency of said signal voltage, thereby to provide a high frequency counting pulse signal;
  c. pulse counter means having first and second stages;
  d. stage selection switch means including a pair of output terminals connected with the first and second stages of said counter means, respectively, said stage selection switch means including also an input terminal;
  e. gate means having an output terminal connected with the input terminal of said stage selection switch means, said gate means including an input terminal connected with said frequency multiplier means;
  f. means including a reference oscillator and frequency divider means for operating said gate means between conductive and non-conductive conditions in which counting pulses from said frequency multiplier means are conducted to and isolated from said stage selection switch means, respectively, said frequency divider means including high and low frequency output terminals;
  g. means including a gate timing switch for varying between two given lengths the duration of the conductive periods of said gate means, said gate timing switch being operable between first and second positions to alternately supply said high and low frequency outputs to said gate means and to simultaneously switch said stage selection switch means between its first and second positions, respectively, whereby when said gate timing and stage selection switches are in their first positions, counting pulses for a measurement of one order of sensitivity are supplied to one stage of said counter means, and when said switches are in their second positions, counting pulses for a measurement of another order of sensitivity are supplied to the other stage of said counter means; and
  h. indicator means connected with said counter means for digitally representing the magnitude of the loda being measured as a function of the instantaneous count of said counter means.

2. Weighing apparatus as defined in claim 1, wherein said mechanical oscillator includes a vibratory measuring string; and further wherein said gate operating means includes a reference string.

3. Apparatus as defined in claim 2, wherein said frequencies and counting periods have such a relationship that the counter result is represented by said indicator means in units of weight.

4. Apparatus as defined in claim 2, and further including a housing in which both said measuring string and said reference string are mounted.

5. Weighing apparatus, comprising
   a. at least one mechanical oscillator means for producing a signal voltage the frequency of which is a function of the force to be measured;
   b. frequency multiplier means for multiplying the frequency of said signal voltage;
   c. counter means for counting the number of pulses of said multiplied signal during a given period of time, said counter means including a forward-reverse counter;
   d. indicator means connected with said counter means for digitally representing the force to be measured as a function of the instantaneous count of said counter means;
   e. means for varying the duration of said counting period, including normally non-conductive gate means connected between said frequency multiplier means and said counter means, and means including a gate timing switch for rendering conductive said gate means for relatively long and relatively short conductive periods, respectively; and
   f. taring means comprising
      1. tare store means for storing an initial tare count;
      2. forward-reverse logic means controlling the direction of operation of said counter means;
      3. counter control means connected with said tare store means and said logic means for transferring to said counter means the count stored in said tare store means, said logic means being operable to initially cause the counter means to count in the reverse direction the pulses to be measured; and
      4. zero detector means connected with said logic means for reversing the direction of said counter means when the count thereof equals zero, whereby when a gross weighing operation follows a determination of tare, the weighing result is the net weight.

* * * * *